US011615054B2

(12) United States Patent
Williams et al.

(10) Patent No.: US 11,615,054 B2
(45) Date of Patent: *Mar. 28, 2023

(54) MERCHANT TABLE AND ASSOCIATED PROCESSES

(71) Applicant: First Data Corporation, Greenwood Village, CO (US)

(72) Inventors: Donna Williams, Sugar Land, TX (US); Jose Tinoco, Marietta, GA (US)

(73) Assignee: FIRST DATA CORPORATION, Brookfield, WI (US)

(*) Notice: Subject to any disclaimer, the term of this patent is extended or adjusted under 35 U.S.C. 154(b) by 67 days.

This patent is subject to a terminal disclaimer.

(21) Appl. No.: 17/207,014

(22) Filed: Mar. 19, 2021

(65) Prior Publication Data
US 2021/0209063 A1 Jul. 8, 2021

Related U.S. Application Data

(63) Continuation of application No. 15/794,602, filed on Oct. 26, 2017, now Pat. No. 10,983,959.

(51) Int. Cl.
*G06F 16/16* (2019.01)
*G06Q 30/02* (2023.01)

(52) U.S. Cl.
CPC .......... *G06F 16/164* (2019.01); *G06Q 30/02* (2013.01)

(58) Field of Classification Search
None
See application file for complete search history.

(56) References Cited

U.S. PATENT DOCUMENTS

| 2011/0078011 | A1 | 3/2011 | Senghore et al. |
| 2013/0124263 | A1 | 5/2013 | Amaro et al. |
| 2015/0287020 | A1* | 10/2015 | Unser ............... G06Q 20/4016 705/44 |
| 2015/0363753 | A1* | 12/2015 | Iannace ............... G06Q 20/389 705/39 |
| 2017/0061434 | A1* | 3/2017 | Tiwari ................... G06Q 40/04 |
| 2017/0178247 | A1 | 6/2017 | Farrell et al. |

OTHER PUBLICATIONS

Final Office Action on U.S. Appl. No. 15/794,602 dated Nov. 3, 2020.
Notice of Allowance on U.S. Appl. No. 15/794,602 dated Feb. 10, 2021.
U.S. Office Action on U.S. Appl. No. 15/794,602 dated May 12, 2020.

* cited by examiner

Primary Examiner — Eddy Cheung
(74) Attorney, Agent, or Firm — Foley & Lardner LLP

(57) ABSTRACT

Tables and techniques to configure the same are provided. In some embodiments, configuration of one or more memory devices can permit or otherwise facilitate including transaction records in a table or another type of data structure, where the transaction records can be organized based at least on a defined location for a merchant or another type of organization associated with the transaction records.

20 Claims, 9 Drawing Sheets

| Merchant_ID | Outlet_Name | Address | City | State | ZIP | PY_SALES | CY_SALES |
|---|---|---|---|---|---|---|---|
| 0000000001 | MERCHANT ABC | 7225 BELL CREEK RD | MECHANICSVLLE | VA | 23111 | 91325.21 | 90041.9 |
| 0000000004 | MERCHANT DEF | 7225 BELL CREEK RD STE 228 | MECHANICSVLLE | VA | 23111 | 24832.82 | 29397.53 |
| 0000000005 | MERCHANT GHI | 7225 BELL CREEK RD # ST212 | MECHANICSVLLE | VA | 23111 | 23161.42 | 16926.38 |
| 0000000002 | MERCHANT ABC | 7225 BELL CREEK RD STE 256 | MECHANICSVLLE | VA | 23111 | 30840.65 | 33433.79 |
| 0000000006 | MERCHANT JKL | 7225 BELL CREEK RD | MECHANICSVLLE | VA | 23111 | 53421.13 | 53381.19 |
| 0000000007 | MERCHANT JKL | 7225 BELL CREEK RD | MECHANICSVLLE | VA | 23111 | 1082.59 | 6319.88 |
| 0000000003 | MERCHANT ABC | 7225 BELL CREEK RD STE 256 | MECHANICSVLLE | VA | 23111 | 13013.28 | 43616.99 |
| 0000000009 | MERCHANT MNO | 7225 BELL CREEK RD STE 238 | MECHANICSVLLE | VA | 23111 | 70264.11 | 67020.42 |
| 0000000010 | MERCHANT PQR | 7225 BELL CREEK RD STE 236 | MECHANICSVLLE | VA | 23111 | 57415.2 | 53212.9 |
| 0000000011 | MERCHANT STU | 7225 BELL CREEK RD | MECHANICSVLLE | VA | 23111 | 19089.86 | 18300 |

FIG. 4A

| LID | UID_GRP | UID | Merchant ID | Outlet Name | Address | ZIP | CY Sales | PY Sales | SlsGth |
|---|---|---|---|---|---|---|---|---|---|
| 23111.7225.BELLC | 194780 | 194780 | 0000000001 | MERCHANT ABC | 7225 BELL CREEK RD | 23111 | 90,042 | 91,325 | -1.4% |
| 23111.7225.BELLC | 194780 | 1880657 | 0000000002 | MERCHANT ABC | 7225 BELL CREEK RD 256 | 23111 | 33,434 | 30,841 | 8.4% |
| 23111.7225.BELLC | 194780 | 1889414 | 0000000003 | MERCHANT ABC | 7225 BELL CREEK RD 256 | 23111 | 43,617 | 13,013 | 235.2% |
| A | | | | | TOTAL | | 167,093 | 135,179 | 23.6% |
| 23111.7225.BELLC | 821682 | 921682 | 0000000004 | MERCHANT DEF | 7225 BELL CREEK RD STE 228 | 23111 | 29,398 | 24,833 | 18.4% |
| 23111.7225.BELLC | 1009287 | 1009287 | 0000000005 | MERCHANT GHI | 7225 BELL CREEK RD # ST212 | 23111 | 16,926 | 23,161 | -26.9% |
| 23111.7225.BELLC | 1888220 | 1888220 | 0000000006 | MERCHANT JKL | 7225 BELL CREEK RD | 23111 | 53,381 | 53,421 | -0.1% |
| 23111.7225.BELLC | 1888220 | 1889050 | 0000000007 | MERCHANT JKL | 7225 BELL CREEK RD | 23111 | 6,320 | 1,083 | 483.8% |
| B | | | | | TOTAL | | 106,025 | 102,498 | 3.4% |
| 23111.7225.BELLC | 2281042 | 2281042 | 0000000009 | MERCHANT MNO | 7225 BELL CREEK RD STE 238 | 23111 | 67,020 | 70,264 | -4.6% |
| 23111.7225.BELLC | 2631357 | 2631357 | 0000000010 | MERCHANT PQR | 7225 BELL CREEK RD STE 236 | 23111 | 53,213 | 57,415 | -7.3% |
| 23111.7225.BELLC | 6003225 | 6003225 | 0000000011 | MERCHANT STU | 7225 BELL CREEK RD | 23111 | 18,300 | 19,090 | -4.1% |
| C 23111.7225.BELLC | | | | | TOTAL | | 411,651 | 384,446 | 7.1% |

FIG. 4B

MERCHANT TABLE AND ASSOCIATED PROCESSES

CROSS REFERENCE TO RELATED APPLICATIONS

This application is a continuation of U.S. application Ser. No. 15/794,602, filed on Oct. 26, 2017, the entirety of which is incorporated by reference herein.

BACKGROUND

Services that rely on electronic transactions typically generate and manage massively large amounts of information, including data and/or metadata. Service platforms that provide such services typically rely on a range of information structures and information storage strategies in order to process such information. It is also common for a service platform to implement hierarchies or other types of relationships between merchants or other organizations that utilize the service platform. As such, analysis and reporting of the information retained by the service platform generally are cumbersome or otherwise complex. Data entry errors and/or omissions compound the complexity of the analysis. Therefore, much remains to be improved in the storage of information in service platforms that rely on electronic transactions.

BRIEF DESCRIPTION OF THE DRAWINGS

FIG. 4A presents an example of a data structure including merchant records in accordance with one or more embodiments of the disclosure.

FIG. 4B presents an example of records in merchant table in accordance with one or more embodiments of the disclosure.

Figure 1:
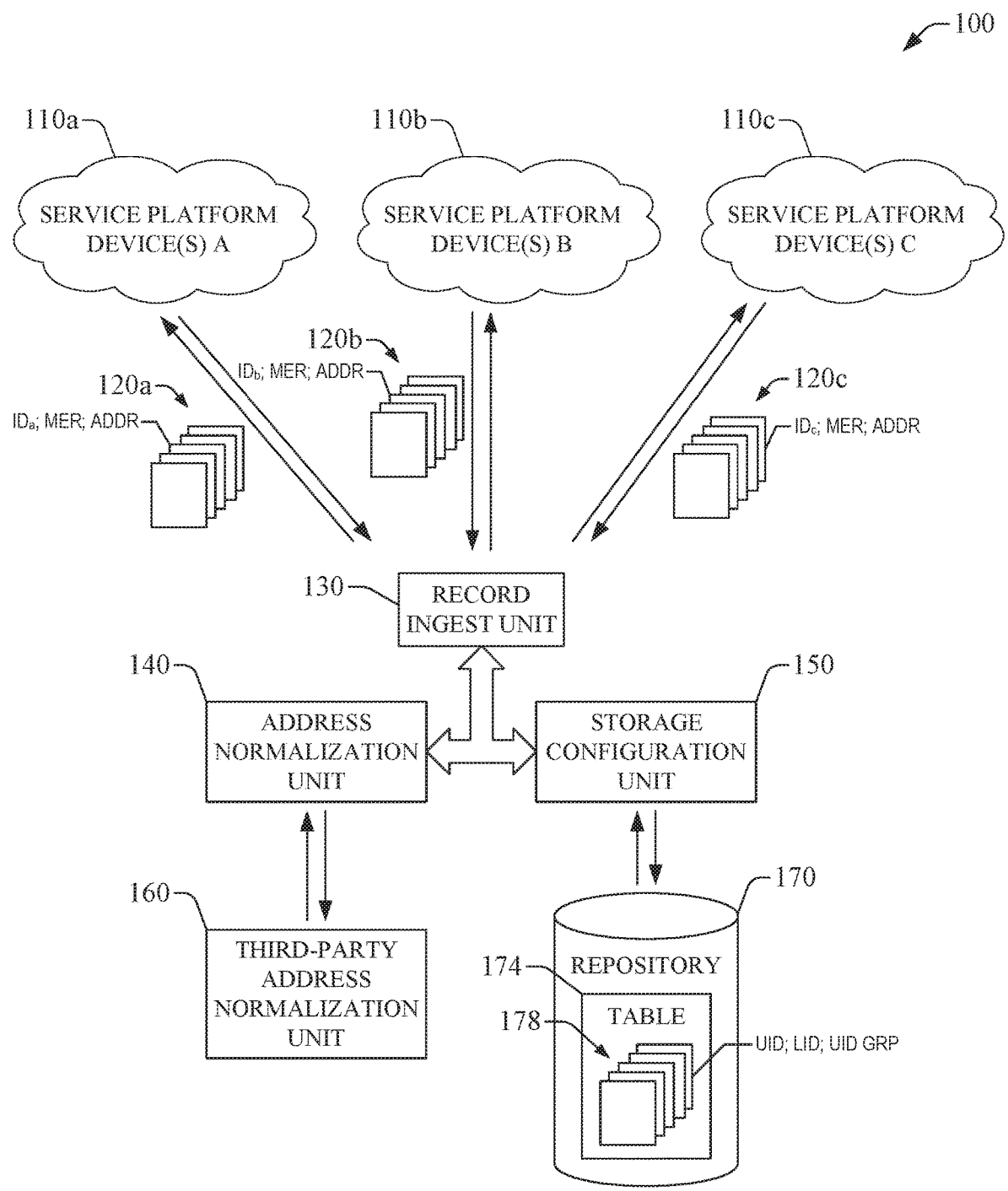
FIG. 1 presents an example of an environment for configuration of merchant tables in accordance with one or more embodiments of the disclosure.

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth in this disclosure. Like numbers refer to like elements throughout.

DETAILED DESCRIPTION

The disclosure recognizes and addresses, in at least some embodiments, the issue of configuration of tables or other types of data structures including transaction records from multiple disparate sources, for various merchants. Accordingly, the disclosure provides embodiments of systems, devices, techniques, and computer program products to configure one or more memory devices to include transaction records in a table or another type of data structure, where the transaction records can be organized based at least on a defined location for a merchant associated with the transaction records. As such, embodiments of the disclosure can generate a unique location identifier (LID) based at least on a normalized address for a merchant address. In one example, the LID can be embodied in or can include a combination of a ZIP code, a street number, and a street name (such as a clean version of a street name present in the merchant address). Merchant addresses can be associated with respective merchant accounts and can be assigned respective LIDs. Merchant accounts having a same merchant address, irrespective of a relationship between the accounts, can have a same LID. Accordingly, in some aspects, a defined LID can permit or otherwise can be utilized to identify merchants in a same region, such as a mall, strip center, a facility, or another confined space having store locations in proximity of each other. In addition, embodiments of the disclosure can apply one or more rules to multiple LIDs in order to identify multiple merchant accounts associated with a single defined location. Each (or, in some embodiments, at least one) of the one or more rules can include one or more attributes associated with a merchant account identified by the merchant ID related to the LID. An attribute can be embodied in or can include, for example, a corporate ID, a chain ID, an agent ID, a tax ID (such as a tax identification number (TIN)), a merchant name, or a brand ID. Further, embodiments of the disclosure can configure records in a memory device, where the records can be included in a table and can be organized or otherwise grouped based at least in part on defined locations of respective merchants or other organizations. In some embodiments, LIDs can be combined with brand IDs for large retailer chains and/or service provider chains in order to identify and accurately store locations of respective retail stores and/or chain stores regardless of a relationship (e.g., a hierarchy structure) between a retailer and a service provider.

In at least some embodiments of this disclosure, the generation of a LID and the application of one or more rules to identify groups of merchant accounts for consolidation of records for a defined location can permit reliable, straight-forward analysis, and/or reporting of information associated with a merchant, for the defined location. As mentioned, the analysis can include longitudinal analysis of merchant transactions, for example.

Embodiments of the disclosure can greatly improve technological processes, such as configuring of one or more memory devices to include a table or another type of data structure, by generating a location identifier or another type of index to clearly and unambiguously identify associated merchant accounts to a defined location. Therefore, the configuration processes in accordance with one or more embodiments of the disclosure can be utilized to accurately identify electronic transaction information (e.g., a product or service sale, an exchange of a product, an upgrade of a service, or the like) for a specific geographical area, for a specific merchant or organization. As such, in contrast to conventional, inaccurate computing systems, embodiments of the disclosure can provide accurate cohort identification. In addition or in the alternative, embodiments of the disclosure can permit or otherwise facilitate supplementing or expanding transaction categories to extant transaction information by matching a transaction category to a defined event. Such a matching is generally unavailable in conventional systems. Further or as another alternative, embodiments of the disclosure can permit or otherwise facilitate event analysis where merchant proximity to a venue of an event (e.g., a stadium for the Super Bowl or another sports event) can be a critical factor to the occurrence of a defined type of electronic transactions. Furthermore or as yet another alternative, embodiments of the disclosure can permit or otherwise facilitate an accurate determination of a relationship between a first location of a first merchant and a second location of another merchant. Therefore, at least some embodiments of the disclosure provide location indices, rules, and/or techniques that can improve the configuration of one or more memory devices to organize records according to a defined location and to include such records in a table or another type of data structure, rather than simply implementing old memory configuration practices in a new computing environment. As mentioned, embodiments of the disclosure can permit analyzing transaction information for a defined merchant or another type of organization, at a defined location. As such, rather than accelerating or otherwise refining conventional techniques for the analysis of transaction information by simply relying on a computational environment, embodiments of the disclosure can speed-up and enhance such analysis as a result of the application of the disclosed indices (UID, LID, UID group values) and techniques for configuring a table in a memory device. Any set of records with name and address components at a minimum can use certain embodiments of this process. Address hygiene (correction and/or normalization of addresses) can enable the LID identification and UID_GRP algorithm. All FIG representations are consistent with address data only.

Embodiments of the disclosure can provide improvements to the operation of a computing system. Specifically, amongst other improvements, certain embodiments provide an improvement to computer-related technology by permitting or otherwise facilitating configuration of one or more memory devices to include a table or another type of data structure not previously performable by a computing system. To that point, in some aspects, embodiments of the disclosure can provide, at a minimum, a particular way to achieve the generation of a table or another type of data structure including records that can be organized, at least in part, according to a defined location related to a merchant account associated with the records. For instance, rather than providing results related to collecting and analyzing information, at least some embodiments of this disclosure can generate identifiers and can apply rules to merchant records to generate, as a function of time (e.g., in real-time, at defined times, according to a schedule), information related to transactions pertaining to a merchant account, for a defined location.

While certain embodiments of the disclosure are illustrated in connection with a merchant, the disclosure is not so limited and at least some of the principles of this disclosure also can be applied to other types of entities and/or organizations.

With reference to the drawings, FIG. 1 illustrates an example of an environment 100 for configuration of merchant tables in accordance with one or more embodiments of the disclosure. The exemplified environment 100 can include groups of service platform devices, each of the groups can provide, or can be associated with providing, a specific service for a merchant. The service can include a billing service, a payment service, a financial reconciliation service, a couponing or incentivization service, a loyalty program, advertising, a location-based service, or the like. The groups of service platform devices can include a first group of service platform devices A 110a, a second group of service platform devices B 110b, and a third group of service platform devices C 110c. As an illustration, the first group of service platform devices A 110a can provide a billing service; the second group of service platform devices B 110b can provide a payment service; and the third group of service platform devices C 110c can provide a financial reconciliation service. Regardless the service that is provided, a group of service platform devices can maintain—e.g., generate, modify, or delete-and/or utilize merchant records associated with merchants that receive or otherwise consume the service. In some embodiments, each of the merchant records can include an identifier (ID) representative of a merchant; a name or other type of label particular to the merchant; and an address of the merchant. The identifier can be embodied in or can include a first string of alphabetic characters; a second string of numeric characters; a third string of alphabetic character(s) and numeric character(s) (such as an alphanumeric code); a fourth string having alphabetic character(s) and special character(s); a fifth string having numeric character(s) and special character(s); or a sixth string having special characters. Each of the merchant records also can include other attributes associated with the merchant. Within the group of service platform devices, a one-to-one relationship is present between IDs and merchants. Stated differently, a device of the group of service platform devices can assign a unique ID to a merchant. In addition, within another group of service platform devices, another one-to-one relationship may be present between other IDs and the merchants. Therefore, in one aspect, a merchant may have two or more different IDs in respective two or more groups of service platform devices. For instance, in one example, the merchant can be assigned an identifier $ID_a$ within a platform including the service platform device(s) A 110a, another identifier $ID_b$ within another platform including the service platform device(s) B 110b, and yet another identifier $ID_c$ within yet another platform including the service platform device(s) C 110c.

The service platform device(s) A 110a, the service platform device (s) B 110b, and/or the service platform device(s) C 110c can send respective groups of merchant records (or, in some embodiments, another type of records) to a system that can generate a table or can modify an extant table in accordance with aspects of this disclosure. A merchant record can be sent to the system in response to (e.g., upon or after) an instruction or another type of directive to configure one or more memory devices, collectively referred to as a repository, to store the table or that store the extant table. More specifically, in some embodiments, at least one of the service platform device(s) A 110*a* can send a group of merchant records 120*a* to the system. As illustrated in FIG. 1, the group of merchant records 120*a* can include at least one record for a merchant (represented with label "MER") having the identifier IDa and a defined address (represented with label "ADDR"). In addition or in other embodiments, at least one of the service platform device(s) B 110*b* can send a group of merchant records 120*b* to the system. The group of merchant records 120*b* can include at least one record for the merchant having, in such a platform, another identifier IDb and the defined address. Further or in yet other embodiments, at least one of the service platform device(s) C 110*c* can send a group of merchant records 120*c* to the system. The group of merchant records 120*c* can include at least one record for the merchant having, in such a platform, yet another identifier IDc and the defined address.

In some embodiments, the system that can generate a table or can modify an extant table in accordance with aspects of this disclosure can include a record ingest unit 130 as is illustrated in FIG. 1. The record ingest unit 130 can receive or otherwise access merchant records from a group of service platform devices. To the end, in some embodiments, a device of the group of service platform devices can send a merchant record to the record ingest unit 130 in response to (e.g., upon, after, or based at least on) an update to the merchant record. In addition or in other embodiments, the record ingest unit 130 can receive a batch of merchant records at defined times. In other embodiments, the record ingest unit 130 can poll or otherwise send a request for records to a defined group of service platform devices. In some aspects, the record ingest unit 130 can receive or otherwise access at least a subset of the group of merchant records 120*a*; at least a subset of the group of merchant records 120*b*, and/or at least a subset of the group of merchant records 120*c*. In some scenarios, the record ingest unit 130 can receive merchant records associated with a merchant and having respective IDs (e.g., $ID_a$, $ID_b$, and $ID_c$).

An address associated with a merchant record received or otherwise accessed by the record ingest unit 130 can be normalized, resulting in a normalized address included in the merchant record. As such, the system that can generate a table or can modify an extant table in accordance with aspects of this disclosure can include an address normalization unit 140 as is illustrated in FIG. 1. In some embodiments, the address normalization unit 140 can normalize the address. To normalize the address, in one example, the address normalization unit 140 can access a reference database (not depicted in FIG. 1) and can confirm or update address information associated with the address. To update the information, in one aspect, the address normalization unit 140 can revise at least a portion of the address information and/or can reformat the address information to comply with a standardized address format. In other embodiments, rather than normalizing the address, the address normalization unit 140 can cause the address to be normalized and can receive the normalized address. Thus, the address normalization unit 140 can send the address over a communication network channel to a third-party address normalization unit 160. In response (e.g., upon or after the address is received), the third-party address normalization unit 160 can validate, correct, and/or normalize the address, and can send the normalized address over the communication network channel to the address normalization unit 140. For instance, the address normalization unit 140 can send over the communication network channel a request message to validate, correct, and/or normalize the address. The third-party address normalization unit 160 can receive the request message and can resolve it by generating the normalized address. The third-party address normalization unit 160 can send over the communication network channel a response message including the normalized address.

In some aspects, normalization of merchant addresses can permit or otherwise facilitate processing or otherwise operating on the normalized addresses to form other respective data structures (such as indices, identifiers, and the like) without ambiguity or other types of artifacts. For instance, a normalized address can be mapped to or otherwise transformed into a LID index using at least the normalized address included in the merchant record. Therefore, regardless of identification protocol implemented by a service platform to index or otherwise identify a merchant (or any other type of organization), merchant records received or otherwise accessed by the record ingest unit 130 can be identified using at least merchant addresses respectively associated with the merchant records. Reliance on a LID can permit or otherwise facilitate identifying merchant records pertaining to a defined merchant regardless the service platform that provides the merchant records.

As illustrated in FIG. 1, the system that can generate a table or can modify an extant table in accordance with aspects of this disclosure can include a storage configuration unit 150 that can generate LIDs for respective normalized merchant addresses. A mapping between normalized addresses and LIDs can represent, in one aspect, a many-to-one relationship. The storage configuration unit 150 can generate a LID in numerous ways. In one example, the storage configuration unit 150 can adjust a normalized address to form a string of characters representative of the normalized address. To that end, in some aspects, the storage configuration unit 150 can determine a format of the normalized address. For instance, the storage configuration unit 150 can access an address field of the normalized address to determine such a format. In some implementations, the storage configuration unit 150 can update the format to include one or more defined types of address elements, such as P.O. Box, County Road or County Rd., State Highway or State Hwy, and the like. In addition or other aspects of the adjustment of the normalized address, the storage configuration unit 150 can remove one or more elements of the normalized address based at least on the format, resulting in a first adjusted normalized address. Specifically, an element indicative of suite, floor, apartment, and/or room can be removed. Further or in yet other aspects of the adjustment of the normalized address, the storage configuration unit 150 can remove one or more of (a) space characters or (b) at least one special character from the first adjusted address to form a second adjusted address including the string of characters. The storage configuration unit 150 can select portions of the string of characters, such as a five-digit ZIP code, street number, a defined number of characters (e.g., left five characters) of a street name, and can generate the LID using at least a combination of the selected portions. In some embodiments, the storage configuration unit 150 can insert defined characters, e.g., "." "_" or to concatenate the selected portions that form the generated LID. As an illustration, a normalized address can be include "7225 Bell Creek Rd, Mechanicsville, Va., 23111," which address the storage configuration unit 150 can adjust to the string of characters "7225BellCreekRdMechanicsvilleVA23111." In addition, using such a string of characters and "." for concatenation, the storage configuration unit 150 can generate the following LID: 23111.7225.BELLC.

Figure 2:
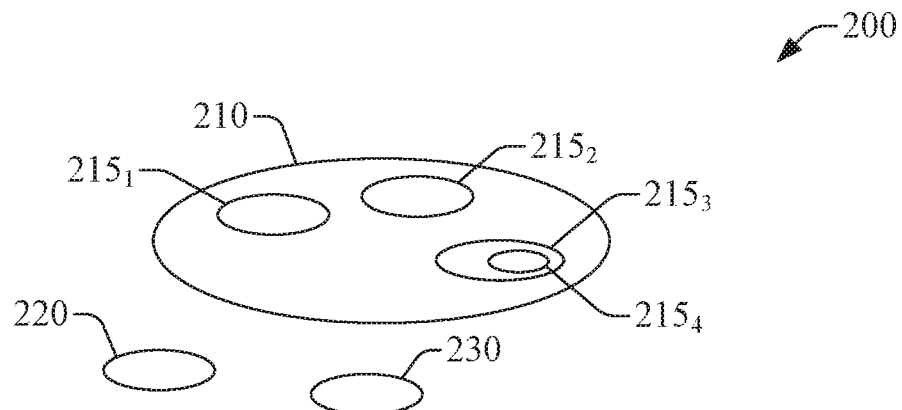
FIG. 2 presents an example of location distribution for a group of merchants in accordance with one or embodiments of the disclosure.

As mentioned, in some embodiments, a LID can be determined using a ZIP code, a street number, and a street name (or, in some embodiments, a cleansed name) of a normalized address associated with a merchant address. Accordingly, multiple stores at an address having a common ZIP code, street number, and street name can have a same LID. Yet, a first store of the multiple stores can correspond to a merchant and a second store of the multiple stores can correspond to another merchant. FIG. 2 illustrates such a scenario, where a region 210 can be represented by an address associated with a defined LID and can contain a first store location 215₁, a second store location 215₂, a third store location 215₃, and a fourth store location 215₄. The region 120 can embody or can constitute, for example, a mall or a strip center. In some embodiments, the first store location 215₁ can correspond to a first merchant (e.g., a videogames retailer); the second store location 215₂ can correspond to a second merchant (e.g., a nutrition supplements retailer); the third store location 215₃ can correspond to a third merchant (e.g., a department store); and the fourth store location 215₄ can correspond to fourth merchant (e.g., a coffee shop or a restaurant). FIG. 2 also illustrates a region 220 that can be represented by another address associated with a second defined LID, and a region 230 that can be represented by yet another address associated with a third LID. The region 220 can correspond to a first parcel including a first store location, and the region 230 can correspond to a second parcel including a second store location.

Figure 3:
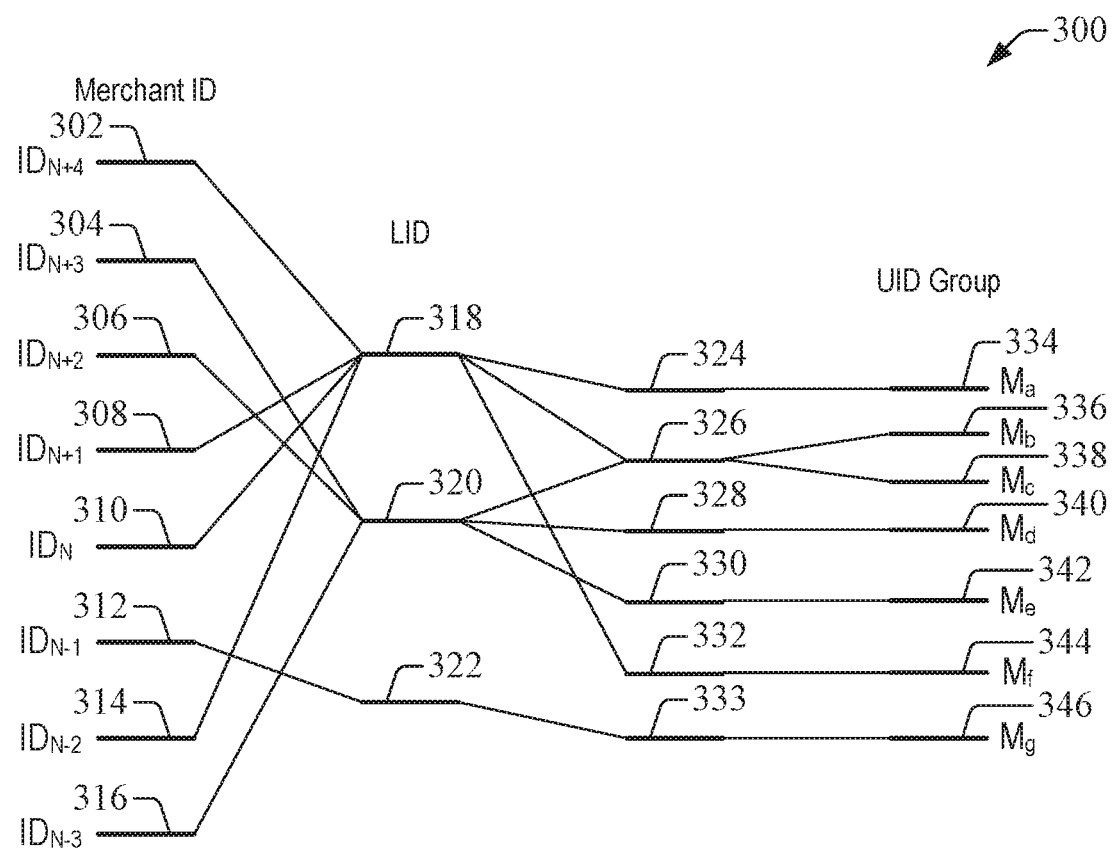
FIG. 3 presents an example of a relationship between indices of records in a merchant table in accordance with one or embodiments of the disclosure.

Location identifiers can be utilized to group or otherwise identify merchant IDs associated with respective merchant records having a common normalized address. As such, information (e.g., data and/or metadata) included in merchant records respectively associated with the merchant IDs can be grouped as a first stage towards consolidation of information pertaining to a defined merchant. FIG. 3 illustrates such a grouping for an example group of merchant IDs having respective normalized addresses. The example group of merchant IDs includes $ID_{N-3}$ 316, $ID_{N-2}$ 314, $ID_{N-1}$ 312, $ID_N$ 310, $ID_{N+1}$ 308, $ID_{N+2}$ 306, $ID_{N+3}$ 304, and $ID_{N+4}$ 302, where N is a natural number. Each $ID_\lambda$, with $\lambda$=N−3, N−2, N−1, N, N+1, N+2, and N+3, has a normalized address and is associated with a LID. In particular, as an example, $ID_{N-2}$ 314, $ID_N$ 310, $ID_{N+1}$ 308, and $ID_{N+4}$ 302 have a first common normalized address that corresponds to LID 318. For instance, $ID_{N+4}$ 302 and $ID_{N-2}$ 314 can be associated, respectively, with the first merchant corresponding to the first store location 215₁ and the second merchant corresponding to the second store location 215₂ in FIG. 2. In addition, $ID_N$ 310 and $ID_{N+1}$ 308 can be associated, respectively, with the third merchant corresponding to the third store location 215₃ and the fourth merchant corresponding to the fourth store location 215₄ in FIG. 2. Further, continuing the example, $ID_{N-3}$ 316, $ID_{N+2}$ 306, and $ID_{N+3}$ 304 have a second common normalized address that corresponds to LID 320. Furthermore, $ID_{N-1}$ 312 has a normalized address that corresponds to a LID 322. For instance, $ID_{N-1}$ 312 can be associated with one of the merchants associated with one of the region 220 or the region 230 in FIG. 2.

With further reference to FIG. 1, the storage configuration unit 150 can assign a record to a defined merchant account based at least on a LID. Thus, in one aspect, the record can be associated with a specific location. Specifically, in one example scenario, the storage configuration unit 150 can determine that a single instance (or occurrence) of a defined LID (e.g., LID 322 in FIG. 3) is present for the merchant records received or otherwise accessed by the record ingestion unit 130. As such, the multiplicity m (a natural number greater than or equal to 1) of the defined LID is equal to 1. The single instance of the defined LID indicates that a single defined location is associated with a merchant account identified by the merchant ID associated with the defined LID. Therefore, in one aspect, the storage configuration unit 150 can determine a unique identifier (UID) and can assign the UID to the merchant account. In one aspect, compared to the merchant ID, for example, the UID can provide increased processing efficiency (e.g., query fulfillment). In addition, or in another aspect, the UID can anonymize the information (e.g., data and/or metadata) included in a record associated with the UID by removing an explicit association between the information and the merchant ID. In addition, the storage configuration unit 150 can configure a UID group to identify records associated with the defined LID, and thus, the defined location. The storage configuration unit 150 can configure the UID group in numerous ways, including determining a value indicative or otherwise representative of the UID group. In the foregoing example scenario in which the defined LID has multiplicity m=1, the value can be equal to the UID assigned to the merchant account. Therefore, the storage configuration unit 150 can configure one or more memory devices 170 (collectively referred to as repository 170) to include a table 174 having one or more records associated with the defined LID. Each record includes the UID, the defined LID, and the UID group value (e.g., UID GRP).

In addition, the storage configuration unit 150 can determine that a defined LID is associated with several of the merchant records received or otherwise accessed by the record ingestion unit 130. As such, the multiplicity m of the defined LID is greater than 1 and one or more merchant accounts may be associated with the defined LID. In one example, the defined LID can be embodied in LID 318 in FIG. 3, and the several records can include a first record having $ID_{N-2}$ 314, a second record having $ID_N$ 310, a third record having $ID_{N+1}$ 308, and a fourth record having $ID_{N+4}$ 302. Thus, in one aspect, the configuration unit 150 can determine that multiple instances of the defined LID are present—e.g., one instance of the defined LID for each of the merchant IDs. In some embodiments, the configuration unit 150 can apply a rule to the multiple instances of the defined LID in order to select or otherwise identify a subset of such instances. The subset of the multiple instances of the defined LID can represent one or more merchant accounts associated with a defined merchant having commercial operations at the location associated with the LID. Specifically, in one example, a first subset of the multiple instances of the defined LID can correspond to first merchant account (s) of a first merchant, and a second subset of the multiple instances can correspond to second merchant account(s) of a second merchant. The rule can include one or more attributes associated with a merchant account identified by the merchant ID related to the LID. An attribute can be embodied in or can include, for example, a tax ID (such as a tax identification number (TIN)), a merchant name, or a brand ID.

In one embodiment, the rule to select or otherwise identify a subset of multiple instances of a defined LID can dictate that an operator (or a function representing the operator) be applied to the defined LID and a tax ID. For instance, the operator can be a concatenation operator that, applied to a first string of characters and a second string of characters, results in a single string of characters including the first string and the second string of characters in sequence. In one scenario, application of the rule can result in the subset including two or more outcomes of the application of the operator being equal, and thus, two or more tax IDs being common to the merchant account(s) associated with the defined LID. The storage configuration unit 150 can configure a UID group for the subset and can assign a value to the UID group that can be equal to a minimum UID value amongst the two or more UIDs corresponding to the merchant accounts having a common tax ID. Therefore, the storage configuration unit 150 can configure the repository 170 to include records having the UID group value in the table 174. Such records are associated with a defined location represented by the defined LID. Similar to other records in the table 174, each record includes the UID, the defined LID, and the UID group value. It is noted that the disclosure is not limited to assigning the UID group to a minimum UID value within a group of UID values, and in some embodiments, a maximum value within the group of UID values or another function of such values can be assigned as the UID group.

In another scenario, application of a rule based on LID and tax ID to multiple instances of a defined LID can result in an empty subset. As such, a common tax ID can be absent amongst the merchant accounts associated with the defined LID. In such a scenario, the storage configuration unit 150 can apply a second rule to the multiple instances of the defined LID. The second rule can be based at least on an attribute different from tax ID. For instance, the attribute can be embodied in a name representative of a merchant, where the name can be a version of the actual name of the merchant. In some embodiments, the rule to select or otherwise identify a subset of the multiple instances of a defined LID can dictate that an operator (or a function representing the operator) be applied to the name representative of the merchant for each of the merchant accounts associated with the multiple instances of the defined LID. Specifically, the operator can select a portion of the name (e.g., a defined number of first characters of the name). As part of the application of the rule, the storage configuration unit 150 can determine that two or more of the merchant accounts have the portion of the name in common. The rule can further dictate that tax IDs respectively associated with the two or more of the merchant accounts be compared. As such, in some instances, the storage configuration unit 150 can determine that two or more of the merchant accounts have a common tax ID. Each of the two or more merchant accounts can have respective two or more UIDs, and the storage configuration unit 150 can assign a minimum of the two or more UIDs as a UID group value for associated with the two or more merchant accounts. Therefore, the storage configuration unit 150 can configure the repository 170 to include records having the UID group value in the table 174. Such records are associated with a defined location represented by the defined LID. Similar to other records in the table 174, each record includes the UID, the defined LID, and the UID group value.

Similar to other rules, in some scenarios, application of a rule based on merchant name and/or tax ID to multiple instances of a defined LID can result in an empty subset. In such a scenario, the storage configuration unit 150 can apply a second rule to the multiple instances of the defined LID. The second rule can be based at least on an attribute different from merchant name and/or tax ID. For instance, the attribute can be embodied in a brand ID associated with a merchant. In some embodiments, the rule to select or otherwise identify a subset of the multiple instances of a defined LID can dictate that for each merchant account associated with the multiple instances of the defined LID, a brand ID of the merchant account be compared with other brand IDs of other merchants accounts associated with the multiple instances of the defined LID. As such, in some instances, the storage configuration unit 150 can determine that two or more of the merchant accounts have a common brand ID. In one example, each of the two or more merchant accounts can have respective two or more UIDs, and the storage configuration unit 150 can assign a minimum of the two or more UIDs as a UID group value for records associated with the defined LID. In another example, each of the two or more merchant accounts can have respective two or more UID group values, and the storage configuration unit 150 can assign a minimum of the two or more UID group values as an updated UID group value for records associated with the two or more merchant accounts. Therefore, the storage configuration unit 150 can configure the repository 170 to include records having the UID group value in the table 174. Such records are associated with a defined location represented by the defined LID. Similar to other records in the table 174, each record includes the UID, the defined LID, and the UID group value.

With further reference to FIG. 1, in some embodiments, the storage configuration unit 150 can perform an integrity analysis in order to ensure that consolidation of records into a UID group is accurate. In some instances, application of a rule to select a subset of merchant accounts associated with multiple instances of a defined LID can yield merchant accounts that satisfy the rule, but violate other grouping criteria. For instance, a franchise owner can have a first franchised store corresponding to a first brand and a second franchised store corresponding to a second brand. Application of a rule based on tax ID associated with a merchant account of the franchise owner can determine that a first account related to the first franchised store and a second account related to the second franchised store pertain to a same UID group. Thus, in view of the different first and second brands, the consolidation of records associated with the first franchised store and the second franchised store can result in information being stored incorrectly in the table 174. Accordingly, the performance of the integrity analysis can result in the dissociation of the first account and the second account from the UID group. To that end, in one aspect, the storage configuration unit 150 can assign a first UID of the first account to a first UID group value for the first account, and a second UID of the second account to a second UID group value for the second account.

As an illustration of the merchant tables and the principles disclosed herein, FIG. 4A present an example of a data structure 400 that includes merchant records before being organized or otherwise configured into a merchant table that utilizes or otherwise leverages LIDs in accordance in accordance with aspects of the disclosure. The data structure 400 is embodied in a table. The record ingest unit 130 can obtain (e.g., receive, collect, or the like) the information in the table. More specifically, in the illustrated arrangement, the table includes a first column 405 labeled "Merchant ID." Each cell in the first column 405 includes data indicative of a merchant ID. The table also includes a second column 410 labeled "Outlet Name." Each cell in the second column 410 includes data indicative of a name of an outlet associated with the merchant ID. The table also includes a third column 415 labeled "address." Each cell in the third column 415 includes data indicative of a portion of an address (e.g., a first line of an address) of the outlet associated with the merchant ID. The table further includes a fourth column 420 labeled "City." Each cell in the fourth column 420 includes data indicative of a city associated with the address of the outlet associated with the merchant ID. The table also includes a fifth column 425 labeled "State." Each cell in the fifth column 425 includes data indicative of a state associated with the city in which the outlet corresponding to the merchant ID is located. The table further includes a sixth column 430 labeled "ZIP." Each cell in the sixth column 430 includes data indicative of a ZIP code (or, in some embodiments, a ZIP+4 code) associated with the address of the outlet associated with the merchant ID. The table also includes a seventh column 435 labeled "PY SALES." Each cell in the seventh column 435 includes data indicative of an amount of sales in a prior year (PY) for the outlet associated with the merchant ID. The table also includes an eight column 440 labeled "CY_SALES." Each cell in the eighth column 435 includes data indicative of an amount of sales in a current year (CY) for the outlet associated with the merchant ID. The particular arrangement of the information in the table shown in FIG. 4 is illustrative, and the disclosure is not limited to such an arrangement.

As mentioned, the storage configuration unit 150 can associate a LID to a merchant ID. To that end, in some embodiments, the storage configuration unit 150 (via a component therein, for example) can determine a UID and can assign the UID to the merchant ID. The UID can be assigned to the merchant ID in a one-to-one relationship, for example. In some embodiments, assigning UIDs to respective merchant IDs can permit creating numeric fields of manageable length in a merchant table 450, rather than relying on text fields representing the merchant IDs. FIG. 4B presents an example of records in such a merchant table in accordance with one or more embodiments of the disclosure. As mentioned, the merchant table 450 can include a first column 460 labeled "UID" and a second column labeled "Merchant ID." Each cell in the first column 460 includes data indicative of a UID associated with a merchant ID indicated by other data in a cell within the second column 464.

As is illustrated in FIG. 4, the storage configuration unit 150 can generate the merchant table 450 to include various records associated with a merchant ID. Such records can be included in the data structure 400 discussed herein. Specifically, the merchant table 450 can include a third column 468 labeled "Outlet Name." Each cell in the third column 468 includes data indicative of a name of an outlet associated with the merchant ID. The merchant table 450 also includes a fourth column 472 labeled "Address." Each cell in the fourth column 472 includes data indicative of a portion of an address (e.g., a first line of an address) of the outlet associated with the merchant ID. In addition, the merchant table 450 can include a fifth column 476 labeled "ZIP." Each cell in the sixth column 430 includes data indicative of a ZIP code (or, in some embodiments, a ZIP+4 code) associated with the address of the outlet associated with the merchant ID. The table also includes a sixth column 440 labeled "CY SALES." Each cell in the eighth column 435 includes data indicative of an amount of sales in a current year (CY) for the outlet associated with the merchant ID. In addition, the merchant table 450 includes a seventh column 482 labeled "PY SALES." Each cell in the seventh column 478 includes data indicative of an amount of sales in a prior year (PY) for the outlet associated with the merchant ID. The merchant table 450 further includes an eighth column 486 labeled "SisGth." Each cell in the eighth column 482 includes data indicative of year-to-year sales growth comparing current year sales and prior year sales. The growth is expressed in percentage, and negative growth represents contraction.

As disclosed herein, the storage configuration unit 150 (or a component therein) can generate LIDs for respective merchant addresses in the data structure 400 shown in FIG. 4A. In some embodiments, the storage configuration unit 150 can generate an LID by using at least three portions of a normalized merchant address, which address can be included in the data structure 400 as discussed herein. Specifically, in one example, ZIP code, street number, and street name (after such a name is cleansed, spaces and special char removed, and shortened to five characters, for exampe). The storage configuration unit 150 also can insert defined characters, e.g., "." "_" or "-" to concatenate the three portions used to generate the LID. Therefore, based on the addresses shown in column 415 and the ZIP codes shown in column 430 of the data structure 400, the storage configuration unit 150 can generate the following LID: 23111.7225.BELLC. Generated LIDs can be included in a column 452 of merchant table 450.

As further disclosed herein, as disclosed herein, the storage configuration unit 150 can apply one or more rules to determine or otherwise identify a same merchant having a merchant name that is recorded differently and/or repeatedly in the data structure 400. In addition or in the alternative, the storage configuration unit 150 can apply one or more rules to determine or otherwise identify a same merchant having a merchant address that is recorded differently and/or repeatedly in the data structure 400. Repeated addresses can originate from merchant records ingested from different service platform device(s); e.g., merchant records 120a from service platform device(s) A 110a and merchant records 120c from service platform device(s) C 110c. Different address for a same merchant also can originate from merchant records ingested from different service platform device(s); e.g., merchant records 120a from service platform device(s) A 110a and merchant records 120b from service platform device(s) B 110b. Accordingly, the application of the rule(s) can reconcile discrepancies and/or account for redundancies in the merchant address, and can permit or otherwise facilitate identifying the merchant despite such discrepancies and/or redundancies. Accordingly, for the merchant, the storage configuration unit 150 can generate a group of records including subgroups associated with respective UIDs. Specifically, as is illustrated in FIG. 4A, Merchant ABC (shown in boldface font for the sake of clarity) can be associated with two addresses: (i) 7225 Bell Creek Rd and (ii) 7225 Bell Creek Rd Ste 256, where address (ii) is repeated.

Accordingly, for the merchant, the storage configuration unit 150 can generate or otherwise determine a group of records including subgroups associated with respective UIDs. Specifically, as is illustrated in FIG. 4A, Merchant ABC (shown in boldface font for the sake of clarity) can be associated with two addresses: (i) 7225 Bell Creek Rd and (ii) 7225 Bell Creek Rd Ste 256, where address (ii) is repeated. It is noted that in some instances, the subgroups can be represented as multiple rows associated with a same merchant. In other instances, a group of records associated with a single UID associated with a single instance of a merchant, as presented in the merchant records, can be generated or otherwise determined.

Upon or after generation or otherwise determination of a group of records including subgroups associated with respective UIDs, the storage configuration unit 150 can assign the lowest UID value of such UIDs as a UID Group value. As such, the storage configuration unit 150 can configure a merchant table to include a column having cells including data indicative of the UID_Group value. For instance, the merchant table 450 includes column 456 labeled "UID_GRP," where each cell includes data indicative of a UID Group value. As is illustrated in FIG. 4B, a group of three rows associated with Merchant ABC can be determined from the records in the data structure 400 illustrated in FIG. 4A. Each of the three rows has a respective UID value, e.g., 194780, 1880657, and 1889414, and a common UID_Group value of 194780. Such values are provided as an illustration and the embodiments of the disclosure can contemplate other values. In addition, a group of two rows associated with Merchant JKL (shown in boldface font for the sake of clarity) can be determined from the records in the data structure 400 illustrated in FIG. 4A. Each of the two rows has a respective UID value, e.g., 1888220 and 1889050, and a common UID_Group value of 1888220. Such values are provided as an illustration and the embodiments of the disclosure can contemplate other values. Further, the merchant table 450 can include several groups, each having a single row.

Consistent with the disclosure in connection with FIG. 3, the storage configuration unit 150 can generate or otherwise configure a UID GRP for each (or, in some embodiments, at least one) LID value that is generated from at least some of the merchant records ingested by the record ingest unit 130 (or a component therein). As mentioned, such merchant records are illustrated in the data structure 400 in FIG. 4A.

After or upon identification of groups of records, each group identified by a UID Group value as described herein, information for a merchant at a defined location (e.g., the region 210 in FIG. 2, for example) represented by a LID can be aggregated or otherwise analyzed for the entirety (or, in some embodiments, a portion) of all available merchant records for the merchant at such a location. In addition or in the alternative, a component (not depicted) included in or otherwise functionally coupled to the storage configuration unit 150 can determine combined data for two or more merchants at a same defined location. For instance, as is illustrated in FIG. 4B, a total amount of sales in a defined period and year-to-year growth can be aggregated or otherwise combined for merchants at a defined location indicated or otherwise represent by a defined LID (e.g., 23111.7225.BELLC).

It is noted that the particular arrangement of the information in the merchant table 450 as is shown in FIG. 4 is illustrative, and the disclosure is not limited to such an arrangement.

Figure 5:
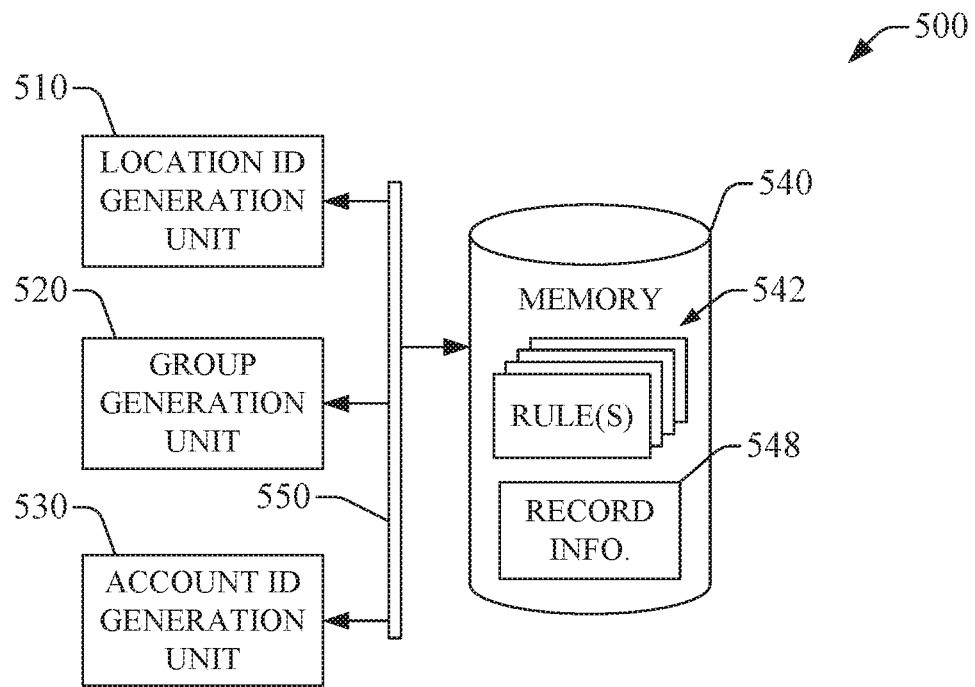
FIG. 5 presents an example of a system for merchant tables in accordance with one or more embodiments of the disclosure.

In some embodiments, the storage configuration unit 150 can be embodied in or can include the system 500 illustrated in FIG. 5. In such embodiments, the location ID unit 510 can generate a LID in accordance with aspects of this disclosure. In addition, the account ID generation unit 530 can generate a UID in accordance with aspects described in this disclosure. In addition, a group generation unit 520 can apply one or more rules to identify related by a defined LID in accordance with aspects described in this disclosure. The one or more rules can be retained in one or more memory elements 542 (referred to as rule(s) 542). The group generation unit 520 can determine UID group values in accordance with aspects described in this disclosure. Further, in one embodiment, the storage configuration unit 150 can be embodied in or can include the system 500 illustrated in FIG. 5. In such an embodiment, the group generation unit 520 can perform or otherwise facilitate the determination or otherwise identification of groups of records and respective UIDs as is described in this disclosure. As is illustrated, one or more bus components 550 (collectively referred to as bus 550) can functionally couple two or more of the location ID generation unit 510, the group generation unit 520, the account ID generation unit 530, and the memory 540. The bus 550 can include at least one of a system bus, a memory bus, an address bus, or a message bus, and can permit exchange of information (data, metadata, and/or signaling) between two or more of the location ID generation unit 510, the group generation unit 520, the account ID generation unit 530, and the memory 540, or respective functional element therein.

Figure 6:
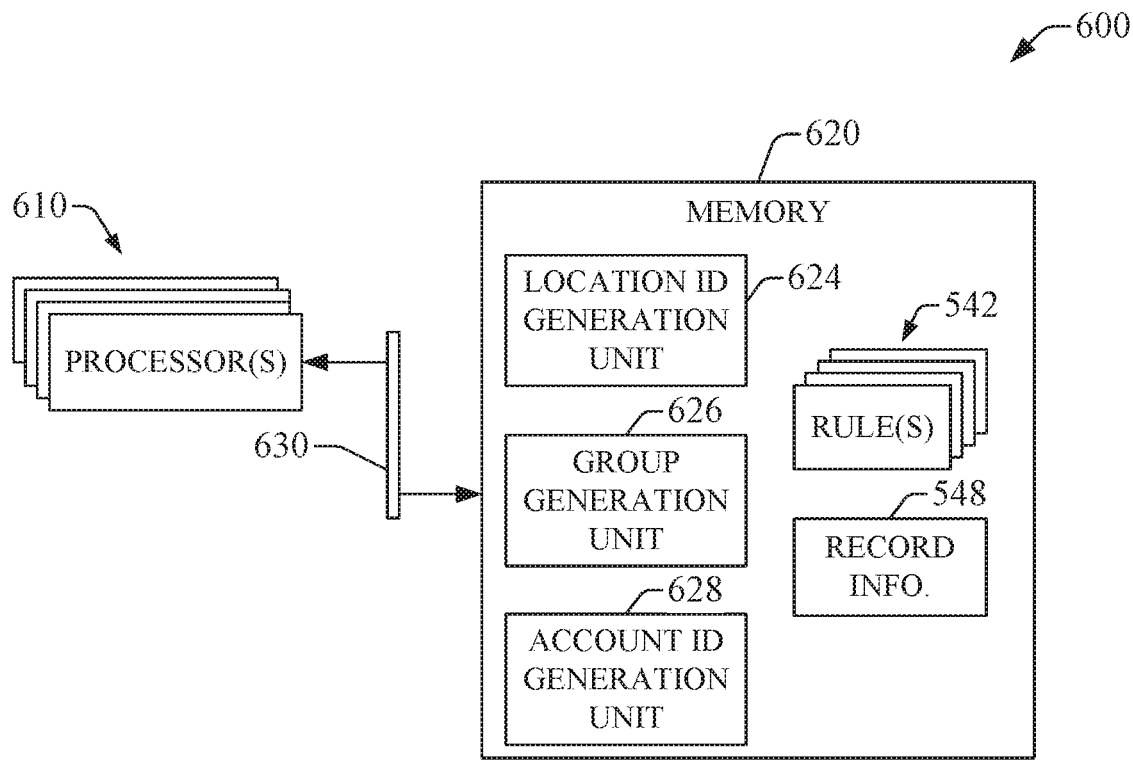
FIG. 6 presents an example of a system for merchant tables in accordance with one or more embodiments of the disclosure.

In some embodiments, the storage configuration unit 150 can be embodied in or can include the system 600 illustrated in FIG. 6. At least one of the processors 610 can execute the location ID generation unit 624 retained in the one or more memory devices 620 to cause the storage configuration unit 150 to generate a LID in accordance with aspects described in this disclosure. The at least one of the processors 610 can execute the account ID generation unit 628 to cause the storage configuration unit 150 to generate a UID in accordance with aspects described in this disclosure. In addition, the at least one of the processors 610 can execute the group generation unit 626 retained in the one or more memory devices 620 to cause the storage configuration unit 150 to configure a UID group and generate a value indicative or otherwise representative of the UID group, in accordance with aspects described in this disclosure. Further, or in one embodiment, the at least one of the processors 610 can execute the group generation unit 626 to cause the storage configuration unit 150 to perform the integrity analysis in accordance with aspects described in this disclosure. As is illustrated, one or more bus components 630 (collectively referred to as bus 630) can functionally couple the at least one processor 610 and the memory 540, and/or two or more of the at least one processor(s) 610. The bus 630 can include at least one of a system bus, a memory bus, an address bus, or a message bus, and can permit exchange of information (data, metadata, and/or signaling) between the at least one processor 610 and the memory 540, and/or two or more of the at least one processor(s) 610, or respective functional element therein.

Figure 7:
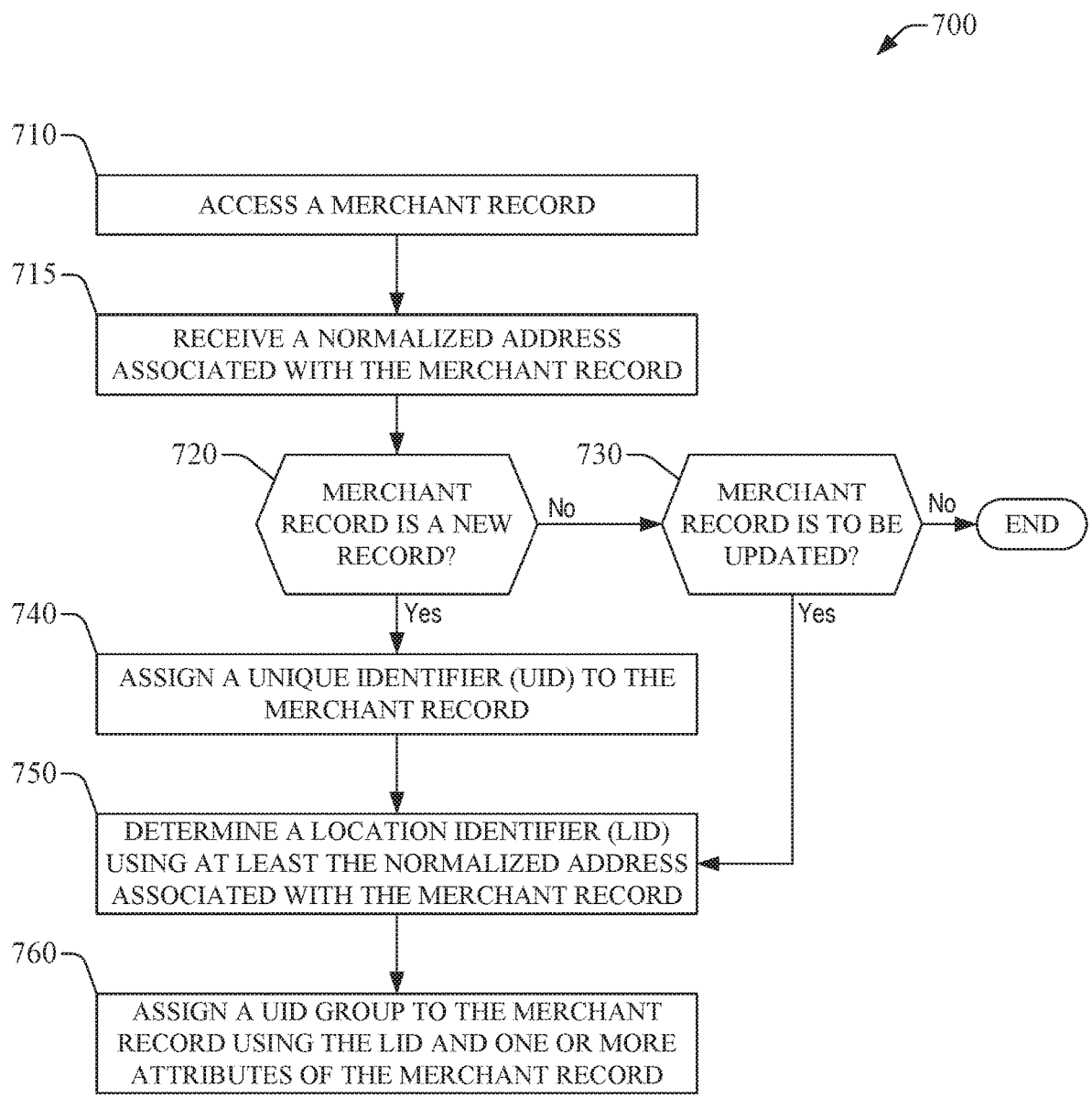
FIG. 7 presents an example of a method for configuring records in a merchant table according to one or more embodiments of the disclosure.
Figure 8:
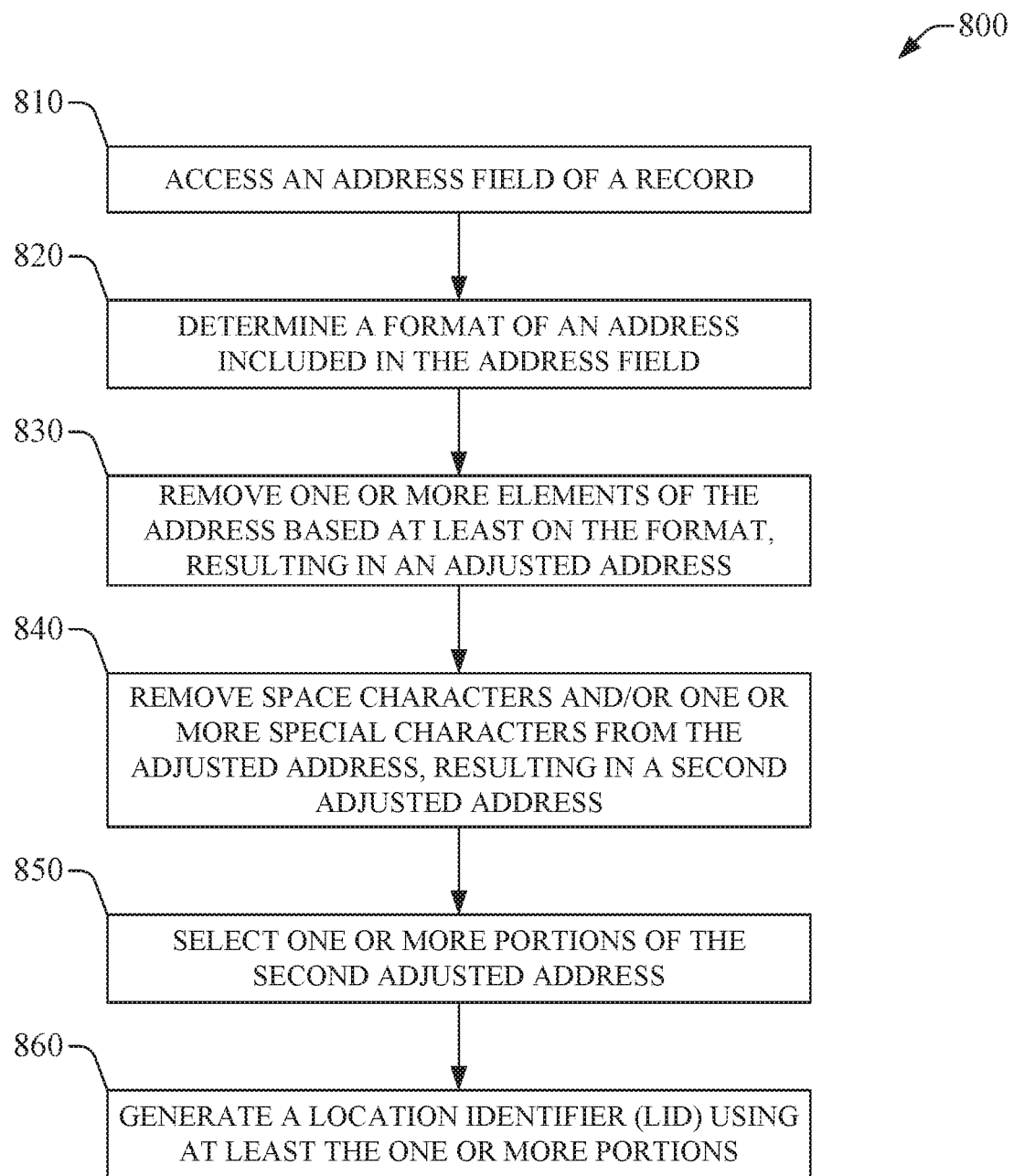
FIG. 8 presents another example of method for configuring records in a merchant table according to one or more embodiments of the disclosure.
Figure 9:
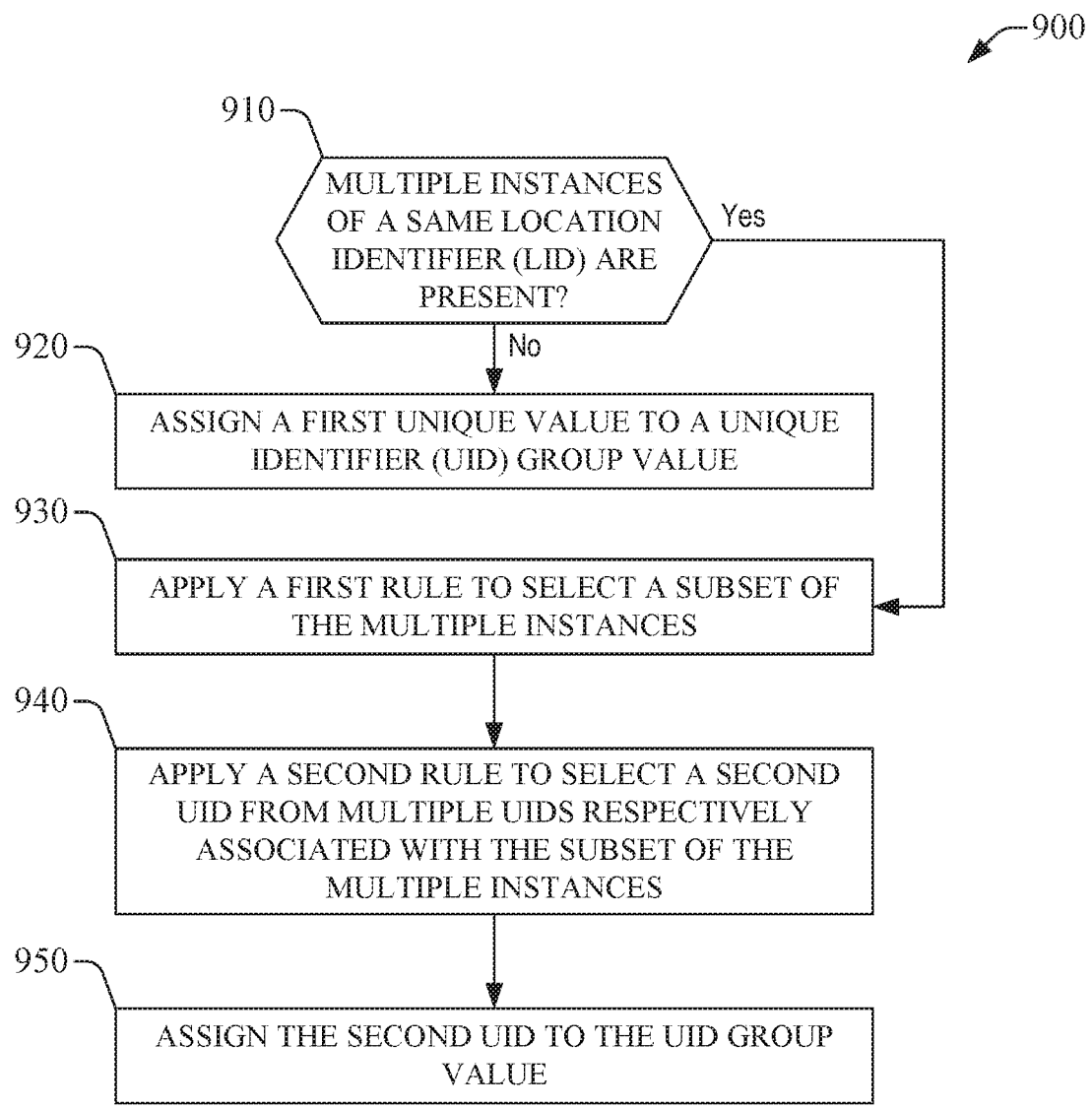
FIG. 9 presents yet another example of method for configuring records in a merchant table according to one or more embodiments of the disclosure.

In view of the aspects of the disclosure described in this disclosure, example methods that can be implemented in accordance with the disclosure can be more readily appreciated with reference to the flowcharts in FIGS. 7-9. For purposes of simplicity of explanation, the example methods described in this disclosure are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described in this disclosure. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or aspects described in this disclosure.

It is noted that the methods of the disclosure can be retained on an article of manufacture, or computer-readable medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described in this disclosure.

FIG. 7 illustrated a flowchart of an example of a method 700 for configuring records in a merchant table according to one or more embodiments of the disclosure. In some embodiments, a computing system that has at least one processor and/or is functionally coupled to at least one processor can implement (e.g., compile, execute, compile and execute, etc.) one or more blocks of the example method 700. In some scenarios, one or more blocks of the example method 700 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 700 being implemented by a distributed or non-distributed computing system, the at least one processor can be functionally coupled to at least one memory device or other types of computer-readable non-transitory storage media.

At block 710, the computing system can access a merchant record. At block 715, the computing system can receive a normalized address associated with the merchant record. In some embodiments, a third-party validation process can be applied to an address associated with the merchant record. To that end, a second computing system functionally coupled to the computing system can validate and/or correct the address, and then normalize the address. In some embodiments, the second computing system can include or can be embodied in the third-party address normalization unit 160. In other embodiments, the second computing system can include or can be embodied in computing device(s) that implement the third-party address normalization unit 160. At block 720, the computing system can determine if the merchant record is a new record. In response to a negative determination, flow can be directed to block 730, at which block the computing system can determine if the merchant record is to be updated. Conversely, in response to determining that the merchant record is a new record, the flow can be directed to block 740, at which block a unique identifier (UID) can be assigned to the merchant record. At block 750, the computing system can determine a location identifier using at least the normalized address associated with the merchant record. As described in this disclosure, the location identifier (e.g., a LID) can be determined in numerous ways, including utilizing multiple portions of the normalized address. At block 760, the computing system can assign a UID group to the merchant record using at least the LID and one or more attributes of the merchant record. As described in this disclosure, the UID group can be determined in numerous ways.

As illustrated in FIG. 7, for an extant merchant record ("No" branch of block 720), an affirmative determination at block 730 can direct the flow to block 750, which can be followed by block 760. Conversely, a negative determination at block 730 can result in the termination of the method 700.

As mentioned, LIDs can be determined in numerous ways. Specifically, FIG. 8 illustrates a flowchart of an example of a method 800 for configuring a LID according to one or more embodiments of the disclosure. The example method 800 can be implemented, entirely or partially, by the computing system that implements the example method 600. At block 810, the computing system can access an address field of a record. At block 820, the computing system can determine a format of an address included in the address field. At block 830, the computing system can remove one or more elements of the address based at least on the format. Removal of the element(s) results in an adjusted address. At block 840, the computing system can remove space characters and/or one or more special characters from the adjusted address. Removal of the space characters and/or the special character(s) can result in a second adjusted address. The second adjusted address can be embodied in a defined string of characters. At block 850, the computing system can select one or more portions of the second adjusted address. In one embodiment, selecting such portion(s) can include selecting a subset of the defined string of characters. At block 860, the computing system can generate a LID using at least the one or more portions.

FIG. 9 illustrates a flowchart of an example of a method 900 for configuring a UID group value according to one or more embodiments of the disclosure. The example method 900 can be implemented, entirely or partially, by the computing system that implements the example method 600 and/or the example method 700. At block 910, the computing system can determine if multiple instances of a same LID are present. In response to a negative determination, flow can proceed to block 920, at which block the computing system can assign a first unique value to a UID group value. Conversely, in response to a positive determination, the computing system can apply a first rule to select a subset of the multiple instances at block 930. At block 940, the computing system can apply a second rule to select a second UID from multiple UIDs respectively associated with the subset of multiple instances. At block 950, the computing system can assign the second UID to the UID group value.

Figure 10:
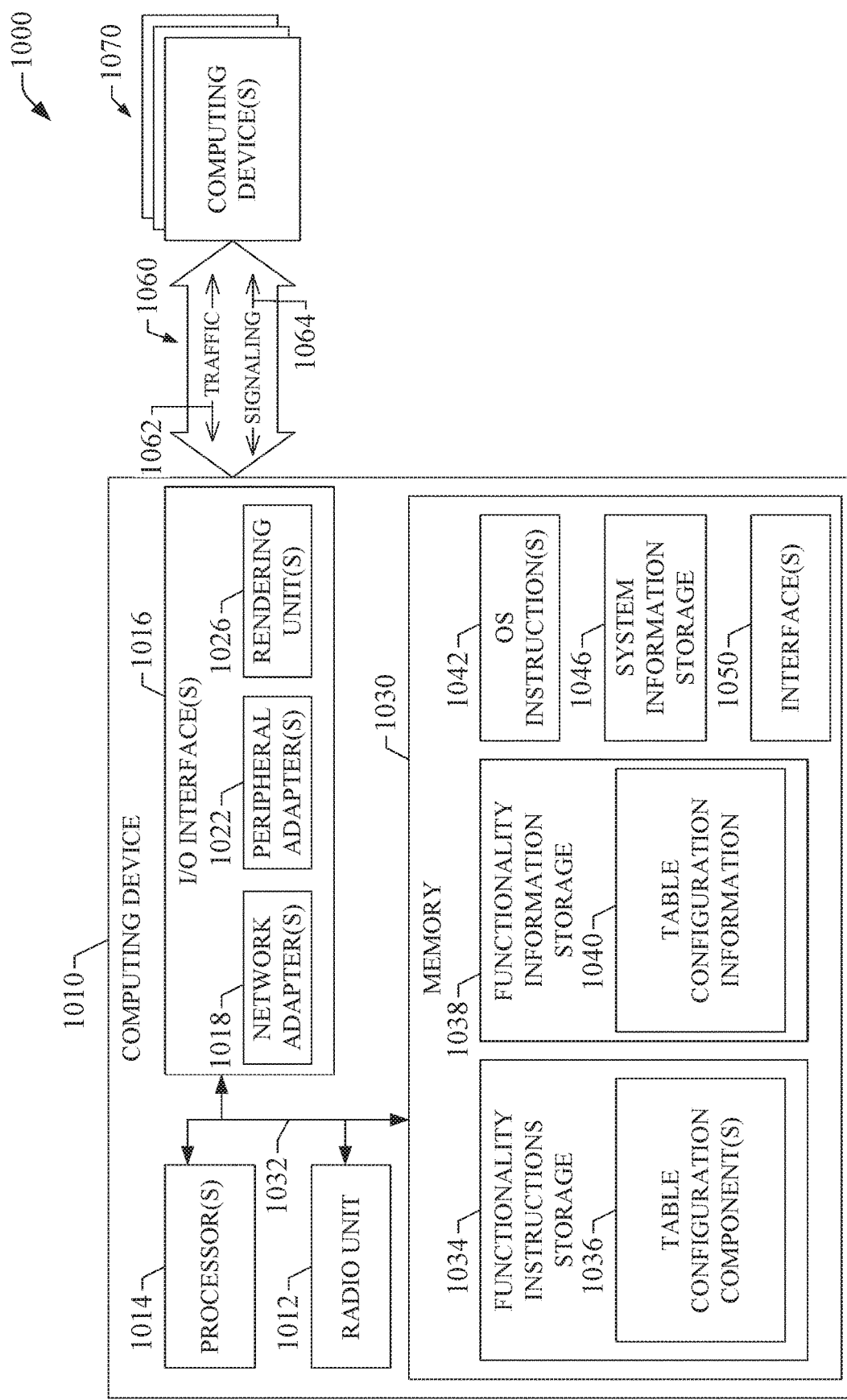
FIG. 10 presents an example of a computing system for merchant tables in accordance with one or more embodiments of the disclosure.

FIG. 10 illustrates a block diagram of an example computational environment 1000 for delivery and/or presentation of directed content in accordance with one or more aspects of the disclosure. The example computational environment 1000 is merely illustrative and is not intended to suggest or otherwise convey any limitation as to the scope of use or functionality of the computational environment's architecture. In addition, the illustrative computational environment depicted in FIG. 10 should not be interpreted as having any dependency or requirement relating to any one or combination of components illustrated in the example operational environments of the disclosure. The example computational environment 1000 or portions thereof can embody or can include, for example, one or more of the operational environment 100.

The computational environment 1000 represents an example implementation of the various aspects or features of the disclosure in which the processing or execution of operations described in connection with the configure records in a memory device described in this disclosure can be performed in response to execution of one or more software components at the computing device 1010. It should be appreciated that the one or more software components can render the computing device 1010, or any other computing device that contains such components, a particular machine for configure records in a memory device, where the records can be included in a table and can be organized or otherwise grouped based at least in part on defined locations of respective merchants or other organizations, as described in this disclosure, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described in this disclosure, such as the example methods presented in FIGS. 6-8. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 1010 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1010 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the configuration of records in a memory device described in this disclosure can comprise personal computers; server computers; laptop devices; handheld computing devices, such as mobile tablets or electronic-book readers (e-readers); wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 1010 can comprise one or more processors 1014, one or more input/output (I/O) interfaces 1016, a memory 1030, and a bus architecture 1032 (also termed bus 1032) that functionally couples various functional elements of the computing device 1010. In certain embodiments, the computing device 1010 can include, optionally, a radio unit 1012. The radio unit 1012 can include one or more antennas and a communication processing unit that can permit wireless communication between the computing device 1010 and another device, such as one of the computing device(s) 1070. The bus 1032 can include at least one of a system bus, a memory bus, an address bus, or a message bus, and can permit exchange of information (data, metadata, and/or signaling) between the processor(s) 1014, the I/O interface(s) 1016, and/or the memory 1030, or respective associated functional elements. In certain scenarios, the bus 1032 in conjunction with one or more internal programming interfaces 1050 (also referred to as interface(s) 1050) can permit such exchange of information. In scenarios in which processor(s) 1014 include multiple processors, the computing device 1010 can utilize parallel computing.

The I/O interface(s) 1016 can permit communication of information between the computing device and an external device, such as another computing device, e.g., a network element or an end-user device. Such communication can include direct communication or indirect communication, such as exchange of information between the computing device 1010 and the external device via a network or elements thereof. As illustrated, the I/O interface(s) 1016 can comprise one or more of network adapter(s) 1018, peripheral adapter(s) 1022, and rendering unit(s) 1026. Such adapter(s) can permit or facilitate connectivity between the external device and one or more of the processor(s) 1014 or the memory 1030. For example, the peripheral adapter(s) 1022 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), Fire-Wire or IEEE-1394.

In one aspect, at least one of the network adapter(s) 1018 can functionally couple the computing device 1010 to one or more computing devices 1070 via one or more traffic and signaling pipes 1060 that can permit or facilitate exchange of traffic 1062 and signaling 1064 between the computing device 1010 and the one or more computing devices 1070. Such network coupling provided at least in part by the at least one of the network adapter(s) 1018 can be implemented in a wired environment, a wireless environment, or both. The information that is communicated by the at least one of the network adapter(s) 1018 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 1070 can have substantially the same architecture as the computing device 1010. In addition or in the alternative, the rendering unit(s) 1026 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 1010, or can permit conveying or revealing the operational conditions of the computing device 1010.

In one aspect, the bus 1032 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 1032, and all buses described in this disclosure can be implemented over a wired or wireless network connection and each of the subsystems, including the processor(s) 1014, the memory 1030 and associated memory elements, and the I/O interface(s) 1016 can be contained within one or more remote computing devices 1070 at physically separate locations, connected through buses of this form, in effect implementing a fully distributed system. In certain embodiments, such a distributed system can implement the functionality described in this disclosure in a client-host or client-server configuration in which the table configuration component(s) 1036 or the table configuration information 1040, or both, can be distributed between the computing device 1010 and at least one of the computing device(s) 1070, and the computing device 1010 and at least one of the computing device(s) 1070 can execute such components and/or leverage such information.

The computing device 1010 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1010, and can comprise, for example, both volatile and non-volatile media, and removable and/or non-removable media. In one aspect, the memory 1030 can comprise computer-readable media in the form of volatile memory, such as random access memory (RAM), and/or non-volatile memory, such as read-only memory (ROM).

The memory 1030 can comprise functionality instructions storage 1034 and functionality information storage 1038. The functionality instructions storage 1034 can comprise computer-accessible instructions that, in response to execution (by at least one of the processor(s) 1014), can implement one or more of the functionalities of the disclosure. The computer-accessible instructions can embody or can comprise one or more software components illustrated as table configuration component(s) 1036. In one scenario, execution of at least one component of the table configuration component(s) 1036 can implement one or more of the methods described in this disclosure, such as example method 600, example method 700, and example method 800. For instance, such execution can cause a processor (e.g., one of the processor(s) 1014) that executes the at least one component to carry out a disclosed example method. It should be appreciated that, in one aspect, a processor of the processor(s) 1014 that executes at least one of the table configuration component(s) 1036 can retrieve information from or retain information in one or more memory elements 1040 in the functionality information storage 1038 in order to operate in accordance with the functionality programmed or otherwise configured by the table configuration component(s) 1036. The one or more memory elements 1040 may be referred to as table configuration information 1040. Such information can include at least one of code instructions, information structures, or the like. For instance, at least a portion of such information structures can include various indices, such as UID, UID group values, LIDs; rules; and other information that can be utilized or otherwise leveraged to configure one or more memory devices to include records in accordance with one or more embodiments described in this disclosure.

In some embodiments, one or more components of the table configuration component(s) 1036 can embody or can constitute at least one of the analysis unit 120 and/or the template generation unit 140. As such, the one or more components can operate in accordance with, and can provide the functionality of, the analysis unit 120 and/or the template generation unit 140 in accordance with aspects described in this disclosure. In other embodiments, one or more of the table configuration component(s) 1036 in combination with at least one of the processor(s) 1014 can embody or can constitute at least one of the analysis unit 120 and/or the template generation unit 140, and can operate in accordance with, and can provide the functionality of, such units in accordance with aspects described in this disclosure.

At least one of the one or more interfaces 1050 (e.g., application programming interface(s)) can permit or facilitate communication of information between two or more components within the functionality instructions storage 1034. The information that is communicated by the at least one interface can result from implementation of one or more operations in a method of the disclosure. In certain embodiments, one or more of the functionality instructions storage 1034 and the functionality information storage 1038 can be embodied in or can comprise removable/non-removable, and/or volatile/non-volatile computer storage media.

At least a portion of at least one of the table configuration component(s) 1036 or table configuration information 1040 can program or otherwise configure one or more of the processors 1014 to operate at least in accordance with the functionality described in this disclosure. One or more of the processor(s) 1014 can execute at least one of the table configuration component(s) 1036 and leverage at least a portion of the information in the functionality information storage 1038 in order to configure records in a memory device, where the records can be included in a table and can be organized or otherwise grouped based at least in part on defined locations of respective merchants or other organizations.

It should be appreciated that, in certain scenarios, the functionality instruction(s) storage 1034 can embody or can comprise a computer-readable non-transitory storage medium having computer-accessible instructions that, in response to execution, cause at least one processor (e.g., one or more of the processor(s) 1014) to perform a group of operations comprising the operations or blocks described in connection with the disclosed methods.

In addition, the memory 1030 can comprise computer-accessible instructions and information (e.g., data, metadata, and/or programming code instructions) that permit or facilitate the operation and/or administration (e.g., upgrades, software installation, any other configuration, or the like) of the computing device 1010. Accordingly, as illustrated, the memory 1030 can comprise a memory element 1042 (labeled operating system (OS) instruction(s) 1042) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 1010 can dictate a suitable OS. The memory 1030 also comprises system information storage 1046 having data, metadata, and/or programming code that permits or facilitates the operation and/or administration of the computing device 1010. Elements of the OS instruction(s) 1042 and the system information storage 1046 can be accessible or can be operated on by at least one of the processor(s) 1014.

It should be recognized that while the functionality instructions storage 1034 and other executable program components, such as the OS instruction(s) 1042, are illustrated herein as discrete blocks, such software components can reside at various times in different memory components of the computing device 1010, and can be executed by at least one of the processor(s) 1014. In certain scenarios, an implementation of the table configuration component(s) 1036 can be retained on or transmitted across some form of computer-readable media.

The computing device 1010 and/or one of the computing device(s) 1070 can include a power supply (not shown), which can power up components or functional elements within such devices. The power supply can be a rechargeable power supply, e.g., a rechargeable battery, and it can include one or more transformers to achieve a power level suitable for the operation of the computing device 1010 and/or one of the computing device(s) 1070, and components, functional elements, and associated related circuitry. In certain scenarios, the power supply can be attached to a conventional power grid to recharge and ensure that such devices can be operational. In one aspect, the power supply can include an I/O interface (e.g., one of the network adapter(s) 1018) to connect operationally to the conventional power grid. In another aspect, the power supply can include an energy conversion component, such as a solar panel, to provide additional or alternative power resources or autonomy for the computing device 1010 and/or one of the computing device(s) 1070.

The computing device 1010 can operate in a networked environment by utilizing connections to one or more remote computing devices 1070. As an illustration, a remote computing device can be a personal computer, a portable computer, a server, a router, a network computer, a peer device or other common network node, and so on. As described in this disclosure, connections (physical and/or logical) between the computing device 1010 and a computing device of the one or more remote computing devices 1070 can be made via one or more traffic and signaling pipes 1060, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 1070) that are functionally coupled (e.g., communicatively linked or otherwise coupled) through a network having traffic and signaling pipes and related network elements. In a distributed computing environment, in one aspect, one or more software components (such as program modules) can be located in both a local computing device 1010 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described in this disclosure with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth in this disclosure be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described in this disclosure, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include an associated processor to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized in this disclosure, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described in this disclosure. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described in this disclosure embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described in this disclosure are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described in the present specification and annexed drawings includes examples of systems, devices, and techniques for configuration of one or more memory devices to include tables and/or data structures. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit of this disclosure. In addition or in the alternative, other embodiments of the disclosure as well as the practice of the disclosure may be apparent from consideration of the specification and annexed drawings. It is intended that the examples put forward in the specification and annexed drawings be considered, in all respects, as illustrative and not restrictive. Although specific terms are employed in this disclosure, they are used in a generic and descriptive sense only and not for purposes of limitation.

What is claimed is:

1. A non-transitory computer-readable media comprising computer-executable instructions stored thereon that when executed by a processor cause the processor to:
    receive a merchant record comprising a merchant identifier (ID) associated with a merchant;
    assign a first unique identifier (UID) to the merchant ID, wherein the first UID anonymizes data in the merchant record;
    determine a location identifier (LID) based at least on an address of the merchant;
    determine that at least one other merchant record in a table of merchant records has a same LID as the LID and, thereupon, to determine a UID group value for the merchant record:
        select a subset of the at least one other merchant record having the same LID based on an attribute of the merchant record;
        select a second UID from multiple UIDs respectively associated with the subset of the at least one other merchant record; and
        assign the second UID as the UID group value for the merchant record;
    add the merchant record in the table along with the first UID and the UID group value; and
    perform at least one of:
        (i) generating a report of information from the table for the merchant for a location defined by the LID, the report comprising a first plurality of UIDs corresponding to the group UID value, or
        (ii) using information from the table based on the LID to perform longitudinal analysis of merchant transactions for a specific geographic area.

2. The non-transitory computer-readable media of claim 1, wherein the attribute of the merchant record to select the subset of the at least one other merchant record comprises at least one of a corporate ID, a chain ID, an agent ID, a tax ID, a merchant name, or a brand ID.

3. The non-transitory computer-readable media of claim 1, wherein to select the second UID, the processor further executes the computer-executable instructions to:
identify a lowest value UID among the multiple UIDs; and
assign the lowest value UID as the second UID.

4. The non-transitory computer-readable media of claim 1, wherein to determine the LID, the processor further executes the computer-executable instructions to:
normalize the address of the merchant to obtain a normalized address;
select a string of characters from the normalized address; and
generate the LID based on the selected string of characters.

5. The non-transitory computer-readable media of claim 4, wherein to normalize the address of the merchant, the processor further executes the computer-executable instructions to reformat the address of the merchant to be in a standardized address format.

6. The non-transitory computer-readable media of claim 4, wherein to select the string of characters, the processor further executes the computer-executable instructions to select one or more of a ZIP code, a street number, or a defined number of characters of a street name from the normalized address.

7. The non-transitory computer-readable media of claim 1, wherein to determine the LID, the processor further executes the computer-executable instructions to:
remove a first element from the address of the merchant to obtain a first adjusted normalized address; and
remove a second element from the first adjusted normalized address to obtain a second adjusted normalized address, wherein the LID is generated based on a string of characters selected from the second adjusted normalized address.

8. The non-transitory computer-readable media of claim 7, wherein the first element comprises at least one of a suite number, floor number, apartment number, or room number; and wherein the second element comprises at least one of a space character or a special character.

9. A system comprising:
one or more memories comprising computer-executable instructions stored thereon; and
one or more processors that execute the computer-executable instructions to:
receive a merchant record comprising a merchant identifier (ID) associated with a merchant;
assign a first unique identifier (UID) to the merchant ID, wherein the first UID anonymizes data in the merchant record;
determine a location identifier (LID) based at least on an address of the merchant;
determine that at least one other merchant record in a table of merchant records has a same LID as the LID and thereupon, to determine a UID group value for the merchant record:
select a subset of the at least one other merchant record having the same LID based on an attribute of the merchant record;
select a second UID from multiple UIDs respectively associated with the subset of the at least one other merchant record; and
assign the second UID as the UID group value for the merchant record;

add the merchant record in the table along with the first UID and the UID group value; and
perform at least one of:
(i) generating a report of information from the table for the merchant for a location defined by the LID, the report comprising a first plurality of UIDs corresponding to the group UID value, or
(ii) using information from the table based on the LID to perform longitudinal analysis of merchant transactions for a specific geographic area.

10. The system of claim 9, wherein the attribute of the merchant record to select the subset of the at least one other merchant record comprises at least one of a corporate ID, a chain ID, an agent ID, a tax ID, a merchant name, or a brand ID.

11. The system of claim 9, wherein to select the second UID, the one or more processors further execute the computer-executable instructions to:
identify a lowest value UID among the multiple UIDs; and
assign the lowest value UID as the second UID.

12. The system of claim 9, wherein to determine the LID, the one or more processors further execute the computer-executable instructions to:
normalize the address of the merchant to obtain a normalized address;
select a string of characters from the normalized address; and
generate the LID based on the selected string of characters.

13. The system of claim 12, wherein to normalize the address of the merchant, the one or more processors further execute the computer-executable instructions to reformat the address of the merchant to be in a standardized address format.

14. The system of claim 12, wherein to select the string of characters, the one or more processors further execute the computer-executable instructions to select one or more of a ZIP code, a street number, or a defined number of characters of a street name.

15. The system of claim 9, wherein to determine the LID, the one or more processors further execute the computer-executable instructions to:
remove a first element from the address of the merchant to obtain a first adjusted normalized address; and
remove a second element from the first adjusted normalized address to obtain a second adjusted normalized address, wherein the LID is generated based on a string of characters selected from the second adjusted normalized address.

16. The system of claim 15, wherein the first element comprises at least one of a suite number, floor number, apartment number, or room number; and wherein the second element comprises at least one of a space character or a special character.

17. A method comprising:
receiving a merchant record comprising a merchant identifier (ID) associated with a merchant;
assigning a first unique identifier (UID) to the merchant ID, wherein the first UID anonymizes data in the merchant record;
determining a location identifier (LID) based at least on an address of the merchant;
determining that at least one other merchant record in a table of merchant records has a same LID as the LID and thereupon determining a UID group value for the merchant record by:

selecting a subset of the at least one other merchant record having the same LID based on an attribute of the merchant record;

selecting a second UID from multiple UIDs respectively associated with the subset of the at least one other merchant record; and assigning the second UID as the UID group value for the merchant record;

adding the merchant record in the table along with the first UID and the UID group value; and performing at least one of:

(i) generating a report of information from the table for the merchant for a location defined by the LID, the report comprising a first plurality of UIDs corresponding to the group UID value, or (ii) using information from the table based on the LID to perform longitudinal analysis of merchant transactions for a specific geographic area.

18. The method of claim 17, wherein the attribute of the merchant record for selecting the subset of the at least one other merchant record comprises at least one of a corporate ID, a chain ID, an agent ID, a tax ID, a merchant name, or a brand ID.

19. The method of claim 17, wherein selecting the second UID comprises:

identifying a lowest value UID among the multiple UIDs; and assigning the lowest value UID as the second UID.

20. The method of claim 17, wherein determining the LID comprises:

normalizing the address of the merchant by:

reformatting the address of the merchant to be in a standardized address format to obtain a normalized address;

removing a first element from the normalized address for obtaining a first adjusted normalized address, wherein the first element comprises at least one of a suite number, floor number, apartment number, or room number; and removing a second element from the first adjusted normalized address for obtaining a second adjusted normalized address, wherein the second element comprises at least one of a space character or a special character;

selecting a string of characters from the second adjusted normalized address, wherein the string of characters comprises one or more of a ZIP code, a street number, or a defined number of characters of a street name; and generating the LID based on the selected string of characters.

* * * * *